(12) United States Patent
Takemoto et al.

(10) Patent No.: US 12,191,696 B2
(45) Date of Patent: Jan. 7, 2025

(54) CONTROL DEVICE, VEHICLE, CONTROL METHOD, AND STORAGE MEDIUM STORING A CONTROL PROGRAM

(71) Applicant: TOYOTA JIDOSHA KABUSHIKI KAISHA, Toyota (JP)

(72) Inventors: Taiki Takemoto, Anjyo (JP); Akira Umemoto, Nagakute (JP); Eiji Kitano, Toyota (JP); Yuji Omiya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 493 days.

(21) Appl. No.: 17/591,778

(22) Filed: Feb. 3, 2022

(65) Prior Publication Data
US 2022/0294253 A1    Sep. 15, 2022

(30) Foreign Application Priority Data

Mar. 9, 2021 (JP) .................... 2021-037731

(51) Int. Cl.
*H02J 7/00* (2006.01)
*H02J 7/34* (2006.01)

(52) U.S. Cl.
CPC ...... *H02J 7/007182* (2020.01); *H02J 7/0063* (2013.01); *H02J 7/342* (2020.01); *H02J 2207/20* (2020.01); *H02J 2310/48* (2020.01)

(58) Field of Classification Search
None
See application file for complete search history.

(56) References Cited

U.S. PATENT DOCUMENTS

| 2010/0007319 | A1 | 1/2010 | Manabe et al. |
| 2013/0099559 | A1 | 4/2013 | Machi et al. |
| 2018/0358832 | A1 | 12/2018 | Son et al. |
| 2019/0329663 | A1* | 10/2019 | Kominami ............ H02J 7/0013 |
| 2020/0070753 | A1* | 3/2020 | Akuzawa ................ B60L 58/20 |
| 2023/0163683 | A1* | 5/2023 | Molina Llorente ......................... H02M 3/1584 323/234 |

FOREIGN PATENT DOCUMENTS

| JP | 2008-104252 A | 5/2008 |
| JP | 5387651 B2 | 1/2014 |

* cited by examiner

*Primary Examiner* — Jared Fureman
*Assistant Examiner* — Aqeel H Bukhari
(74) *Attorney, Agent, or Firm* — Oliff PLC

(57) ABSTRACT

A control device for controlling a first DC-DC converter and a second DC-DC converter that supply power to equipment, the control device comprising a processor configured to fix an output of the first DC-DC converter at a maximum and perform feedback control such that an output of the second DC-DC converter satisfies a predetermined condition in a case in which the output of the first DC-DC converter has reached the maximum.

7 Claims, 10 Drawing Sheets

CONTROL DEVICE, VEHICLE, CONTROL METHOD, AND STORAGE MEDIUM STORING A CONTROL PROGRAM

CROSS-REFERENCE TO RELATED APPLICATION

This application is based on and claims priority under 35 USC 119 from Japanese Patent Application No. 2021-037731 filed on Mar. 9, 2021, the disclosure of which is incorporated by reference herein.

BACKGROUND

Technical Field

The present disclosure relates to a control device, a vehicle, a control method, and a storage medium storing a control program.

Related Art

Japanese Patent No. 5387651 discloses a power supply system for performing coordinated control of plural DC-DC converters.

Power supply systems may prioritize use of one DC-DC converter over another DC-DC converter by applying a relatively high instructed voltage value to the one DC-DC converter and applying a relatively low instructed voltage value to the other DC-DC converter. However, in such cases, an increase in load of equipment could cause the voltage of this equipment to become fixed to the DC-DC converter with the relatively low instructed voltage value.

An object of the present disclosure is to provide a control device, a vehicle, a control method, and a storage medium storing a control program that supply a demanded voltage to equipment, irrespective of the load of this equipment, in cases in which power is supplied to the equipment by plural DC-DC converters.

Solution to Problem

A first aspect is a control device for controlling a first DC-DC converter and a second DC-DC converter that supply power to equipment. The control device includes a control section configured to fix an output of the first DC-DC converter at the maximum and perform feedback control such that an output of the second DC-DC converter satisfies a predetermined condition in cases in which output of the first DC-DC converter has reached a maximum.

The first aspect is the control device that controls the first DC-DC converter and the second DC-DC converter. The first DC-DC converter and the second DC-DC converter are each capable of supplying power to the same equipment. In this control device, for example, in cases in which the output of the first DC-DC converter has reached the maximum while power supply to the equipment is being prioritized over that from the second DC-DC converter, the control section performs feedback control such that an output of the second DC-DC converter satisfies the predetermined condition.

Note that examples of satisfying the predetermined condition include reaching a target value for the voltage demanded by the equipment, and reaching a target value for a reference voltage of a battery that supplies power to the equipment. In cases in which an output of the first DC-DC converter has reached the maximum, the control device performs feedback control using the second DC-DC converter, thereby enabling the demanded voltage to be supplied to the equipment irrespective of the load of the equipment.

A control device of a second aspect is the control device of the first aspect, wherein in a case in which an instructed voltage value of the first DC-DC converter is below a maximum value, the control section is configured to perform feedback control such that the instructed voltage value of the first DC-DC converter becomes a first target value, and to perform control such that an instructed voltage value of the second DC-DC converter becomes a value that is lower by a predetermined value than the instructed voltage value of the first DC-DC converter. In a case in which the instructed voltage value of the first DC-DC converter has reached the maximum value, the control section is configured to perform control such that the instructed voltage value of the first DC-DC converter remains at the maximum value and to perform feedback control such that the instructed voltage value of the second DC-DC converter becomes a second target value.

In the control device of the second aspect, under normal circumstances in which the output of the first DC-DC converter is more than sufficient, feedback control is performed such that the instructed voltage value of the first DC-DC converter becomes the first target value, and control is performed such that the instructed voltage value of the second DC-DC converter becomes a value that is lower by the predetermined value than the instructed voltage value of the first DC-DC converter. Voltage to the equipment is thereby maintained. On the other hand, when the first DC-DC converter has reached maximum output under excessive load, feedback control is performed such that the instructed voltage value of the second DC-DC converter becomes the second target value, while the instructed voltage value of the first DC-DC converter remains at the maximum. This control device enables the demanded voltage to be supplied to the equipment irrespective of the load of the equipment under normal circumstances, and enables the voltage to the equipment to quickly attain the second target value using the second DC-DC converter from when the load starts to increase to when the load becomes excessive.

A control device of a third aspect is the control device of the first aspect, wherein in a case in which an instructed voltage value of the first DC-DC converter is below a maximum value, the control section is configured to perform feedback control such that the instructed voltage value of the first DC-DC converter becomes a first target value, and to perform feedback control such that an instructed voltage value of the second DC-DC converter becomes a value that is a lower by predetermined value than the first target value. In a case in which the instructed voltage value of the first DC-DC converter has reached the maximum value, the control section is configured to perform control such that the instructed voltage value of the first DC-DC converter remains at the maximum value and to perform feedback control such that the instructed voltage value of the second DC-DC converter becomes a second target value.

In the control device of the third aspect, under normal circumstances in which the output of the first DC-DC converter is more than sufficient, feedback control is performed such that the instructed voltage value of the first DC-DC converter becomes the first target value, and to feedback control is performed such that the instructed voltage value of the second DC-DC converter is at a value that is lower by the predetermined value than the first target value. Voltage to the equipment is thereby maintained. On the other hand, when the first DC-DC converter has reached maximum output under excessive load, feedback control is performed such that the instructed voltage value of the second DC-DC converter becomes the second target value, while the instructed voltage value of the first DC-DC converter remains at the maximum. This control device enables the demanded voltage to be supplied to the equipment irrespective of the load of the equipment under normal circumstances, and enables the voltage to be speedily raised in line with an increase in load using the second DC-DC converter in cases in which the load starts to increase.

A control device of a fourth aspect is the control device of the second aspect, wherein, in a case in which the instructed voltage value of the first DC-DC converter is below the maximum value and a specific load has been generated at the equipment, the control section is further configured to perform feedback control such that the instructed voltage value of the first DC-DC converter becomes a third target value, and perform feedback control such that the instructed voltage value of the second DC-DC converter becomes a value that is lower by a predetermined value than the third target value.

A characteristic feature of the control device of the fourth aspect lies in the control method applied to the second DC-DC converter under normal circumstances in which the output of the first DC-DC converter 25 is more than sufficient. In this control device, control is performed such that the instructed voltage value of the second DC-DC converter becomes a value that is a lower by predetermined value than the instructed voltage value of the first DC-DC converter. Voltage to the equipment is thereby maintained. However, in cases in which the specific load has been generated at the equipment, feedback control is performed such that the instructed voltage value of the second DC-DC converter becomes a value that is lower by a predetermined value than the third target value. Voltage to the equipment is thereby maintained. This control device enables the manner in which the voltage to the equipment is tracked to be varied according to the load type.

A control device of a fifth aspect is the control device of any one of the second aspect to the fourth aspect, wherein the predetermined value is set to a value that takes account of variation in DC-DC converter output.

If the predetermined value is too large, in cases in which the load of the equipment increases such that the output of the first DC-DC converter becomes insufficient, a voltage supplemented by the output of the second DC-DC converter is low. Further, if the predetermined value is too small, the output priority relationship is disrupted if there is variation in the outputs of the two DC-DC converters, such that prioritized output by the first DC-DC converter is unachievable. The control device of the fifth aspect enables output supplemented by the second DC-DC converter to be ensured while ensuring prioritized output from the first DC-DC converter.

A vehicle of a sixth aspect includes the control device of any one of the first aspect to the fifth aspect, a high voltage battery configured to supply power to each of the first DC-DC converter and the second DC-DC converter, and an auxiliary equipment battery configured to supply power to the equipment and to receive power supplied from each of the first DC-DC converter and the second DC-DC converter.

In the vehicle of the sixth aspect, in cases in which the output of the first DC-DC converter is at the maximum, feedback control is performed using the second DC-DC converter, thereby enabling the demanded voltage to be supplied to the equipment irrespective of the load of the equipment, and enabling the auxiliary equipment battery to be maintained at a predefined charge level.

A control method of a seventh aspect is a control method for execution by a computer to control a first DC-DC converter and a second DC-DC converter that supply power to equipment, the control method including processing including, in a case in which an output of the first DC-DC converter has reached a maximum, fixing the output of the first DC-DC converter at the maximum and performing feedback control such that an output of the second DC-DC converter satisfies a predetermined condition.

The control method of the seventh aspect is a method to control the first DC-DC converter and the second DC-DC converter. As described above, the first DC-DC converter and the second DC-DC converter are each capable of supplying power to the same equipment. In this control method, for example, in a case in which an output of the first DC-DC converter has reached the maximum while power supply to the equipment is being prioritized over that from the second DC-DC converter, the computer performs feedback control such that the output of the second DC-DC converter satisfies the predetermined condition. Note that satisfying the predetermined condition is as described previously. In this control method, in a case in which the an output of the first DC-DC converter has become the maximum, feedback control is performed using the second DC-DC converter, thereby enabling the demanded voltage to be supplied to the equipment irrespective of the load of the equipment.

An eighth aspect is a non-transitory storage medium storing a control program. The control program is a control program executable by computer to perform processing to control a first DC-DC converter and a second DC-DC converter that supply power to equipment, processing comprising, in a case in which an output of the first DC-DC converter has reached a maximum, fixing the an output of the first DC-DC converter at the maximum and performing feedback control such that output of the second DC-DC converter satisfies a predetermined condition.

The control program stored in the non-transitory storage medium of the eighth aspect causes a computer to execute control of the first DC-DC converter and the second DC-DC converter. As described above, the first DC-DC converter and the second DC-DC converter are each capable of supplying power to the same equipment. In this program, for example, in a case in which an output of the first DC-DC converter has reached the maximum while power supply to the equipment is being prioritized over that from the second DC-DC converter, the computer performs feedback control such that the an output of the second DC-DC converter satisfies the predetermined condition. Note that satisfying the predetermined condition is as described previously. In this program, in a case in which the output of the first DC-DC converter has become the maximum, feedback control is performed using the second DC-DC converter, thereby enabling the demanded voltage to be supplied to the equipment irrespective of the load of the equipment.

Advantageous Effects of Invention

In cases in which power is supplied to equipment by plural DC-DC converters, the present disclosure enables the demanded voltage to be supplied to the equipment, irrespective of the load of this equipment.

BRIEF DESCRIPTION OF THE DRAWINGS

Exemplary embodiments of the present disclosure will be described in detail based on the following figures, wherein.

DETAILED DESCRIPTION

Detailed explanation follows regarding examples of exemplary embodiments of the present disclosure, with reference to the drawings.

First Exemplary Embodiment

Configuration

Figure 1:
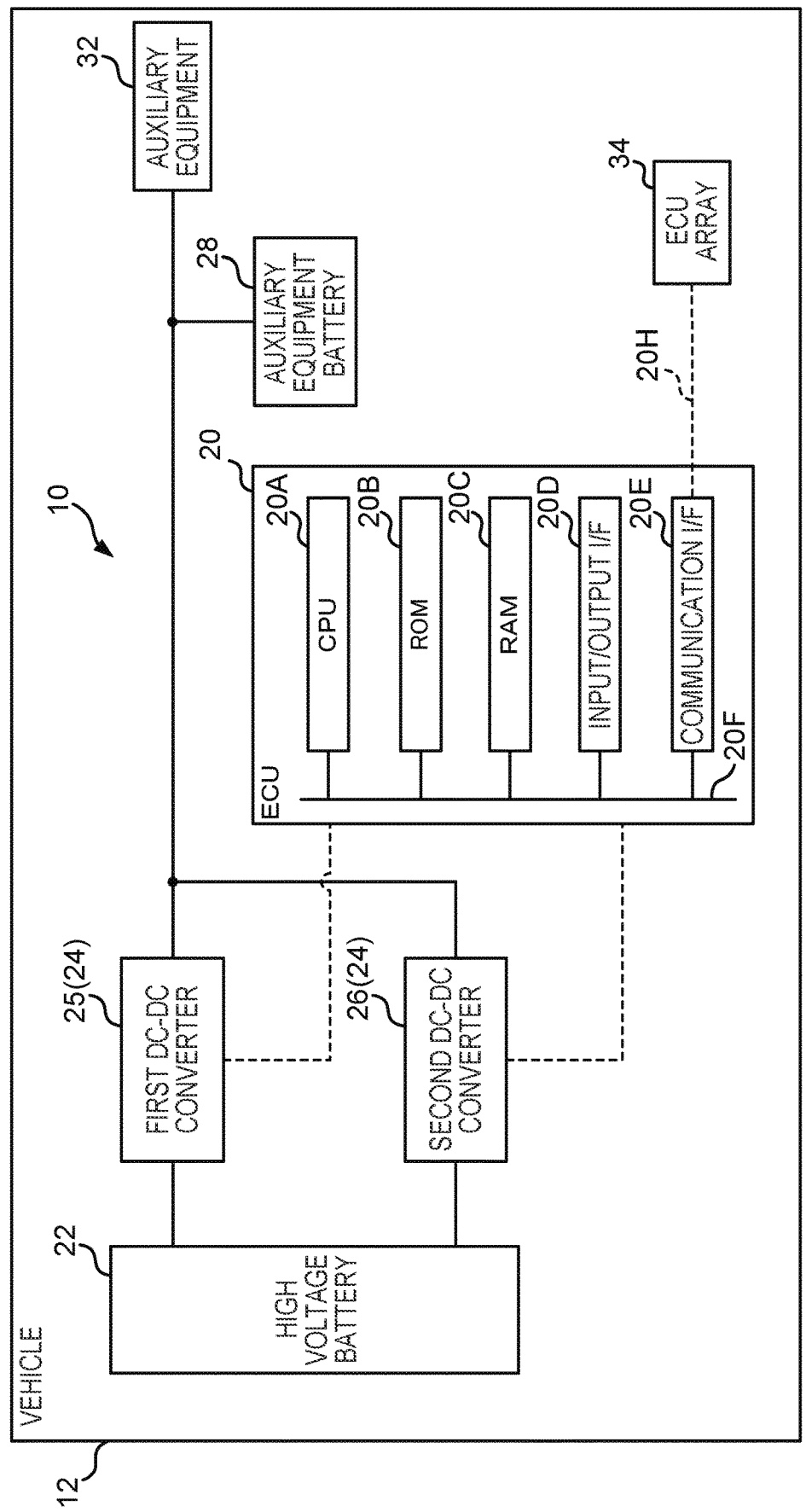
FIG. 1 is a schematic configuration diagram illustrating a vehicle and a power supply system according to a first exemplary embodiment.

As illustrated in FIG. 1, a power supply system 10 of the first exemplary embodiment is installed in a vehicle 12. The vehicle 12 is, for example, an electric vehicle (EV) or a hybrid vehicle (HV). The vehicle 12 of the present exemplary embodiment is supplied with power by the power supply system 10. The vehicle 12 includes auxiliary equipment 32 that is equipment that operates respective sections of the vehicle 12, and an ECU array 34 that controls respective sections of the vehicle 12, including the auxiliary equipment 32.

The power supply system 10 is configured including an ECU 20 serving as a control device, a high voltage battery 22, DC-DC converters 24, and an auxiliary equipment battery 28. The ECU 20 will be described in detail later. The DC-DC converters 24 of the present exemplary embodiment include a first DC-DC converter 25 and a second DC-DC converter 26.

The high voltage battery 22 is a high voltage battery used to operate a travel motor and the like involved in driving the vehicle 12. The high voltage battery 22 is a rechargeable battery capable of charging and discharging, such as a lithium battery or a nickel-hydrogen battery. The high voltage battery 22 is connected to the first DC-DC converter 25 and the second DC-DC converter 26.

The first DC-DC converter 25 includes functionality to supply power output by the high voltage battery 22 to the auxiliary equipment battery 28 and the auxiliary equipment 32. The high voltage battery 22 is connected to an input side of the first DC-DC converter 25, and the auxiliary equipment battery 28 and the auxiliary equipment 32 are connected to an output side of the first DC-DC converter 25. When supplied with power, the first DC-DC converter 25 steps down the input voltage, namely the output voltage of the high voltage battery 22, to a predetermined voltage based on an instruction from the ECU 20, and outputs the stepped-down voltage to the auxiliary equipment battery 28 and the auxiliary equipment 32.

The second DC-DC converter 26 has similar functionality to that of the first DC-DC converter 25. Namely, the second DC-DC converter 26 includes functionality to supply power output by the high voltage battery 22 to the auxiliary equipment battery 28 and the auxiliary equipment 32. The high voltage battery 22 is connected to an input side of the second DC-DC converter 26, and the auxiliary equipment battery 28 and the auxiliary equipment 32 are connected to an output side of the second DC-DC converter 26. When supplied with power, the second DC-DC converter 26 steps down the input voltage, namely the output voltage of the high voltage battery 22, to a predetermined voltage based on an instruction from the ECU 20, and outputs the stepped-down voltage to the auxiliary equipment battery 28 and the auxiliary equipment 32.

Note that in the power supply system 10 of the present exemplary embodiment, the ECU 20, described later, performs control so as to prioritize the first DC-DC converter 25 over the second DC-DC converter 26 when supplying power to the auxiliary equipment 32.

The auxiliary equipment battery 28 is a battery capable of operating the auxiliary equipment 32, and is configured by a rechargeable battery capable of charging and discharging, such as a lead-acid battery or a lithium ion battery. The auxiliary equipment battery 28 is connected to both the first DC-DC converter 25 and the second DC-DC converter 26, and is capable of receiving power supply from the first DC-DC converter 25 and the second DC-DC converter 26 respectively. The auxiliary equipment battery 28 is connected to the auxiliary equipment 32 of the vehicle 12, and supplies power to the auxiliary equipment 32.

The ECU 20 is, for example, configured by a microcomputer, and includes functionality to control the first DC-DC converter 25 and the second DC-DC converter 26. The ECU 20 thereby supplies power from the high voltage battery 22 to the auxiliary equipment battery 28 and the auxiliary equipment 32 via the first DC-DC converter 25 and the second DC-DC converter 26.

The ECU 20 is configured including a central processing unit (CPU) 20A, read only memory (ROM) 20B, random access memory (RAM) 20C, an input/output interface (I/F) 20D, and a communication I/F 20E. The CPU 20A, the ROM 20B, the RAM 20C, the input/output I/F 20D, and the communication I/F 20E are connected together through an internal bus 20F so as to be capable of communicating with each other. The CPU 20A is an example of a processor, and the RAM 20C is an example of memory.

The CPU 20A is a central processing unit that executes various programs and controls various sections. Namely, the CPU 20A reads a program from the ROM 20B, and executes the program using the RAM 20C as a workspace.

Figure 2:
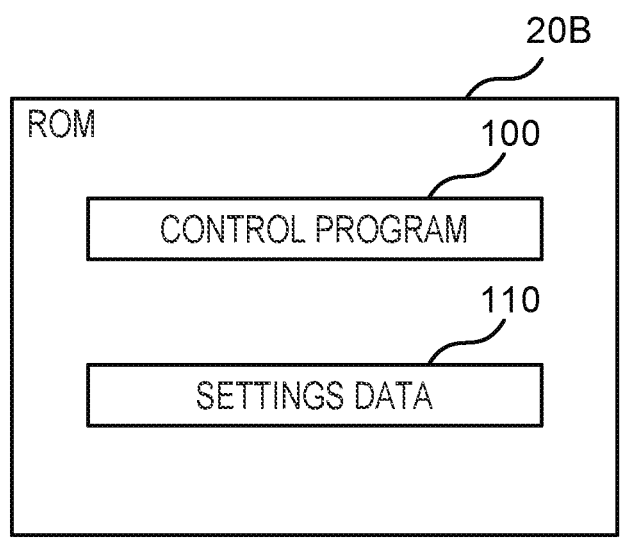
FIG. 2 is a block diagram illustrating configuration of a ROM of an ECU of the first exemplary embodiment.

The ROM 20B serves as a storage section, and stores various programs and various data. As illustrated in FIG. 2, the ROM 20B of the present exemplary embodiment stores a control program 100 and settings data 110.

The control program 100 is a program used to control the ECU 20. The ECU 20 controls the first DC-DC converter 25 and the second DC-DC converter 26 under control based on the control program.

The settings data 110 stores control parameters for feedback control of each of the DC-DC converters.

As illustrated in FIG. 1, the RAM 20C serves as a workspace that temporarily stores programs and data.

The input/output I/F 20D is an interface for communicating with the first DC-DC converter 25 and the second DC-DC converter 26 respectively.

The communication I/F 20E is an interface for connecting to the ECU array 34. This interface may employ a communication protocol such as a CAN. The communication I/F 20E is connected to an external bus 20H. The ECU 20 is thus capable of acquiring operational statuses of respective sections of the vehicle 12 via the communication I/F 20E.

Note that the ECU 20 may include storage, serving as a storage section, in addition to the ROM 20B, or instead of the ROM 20B. Such storage may, for example, be configured by a hard disk drive (HDD) or a solid state drive (SSD).

Figure 3:
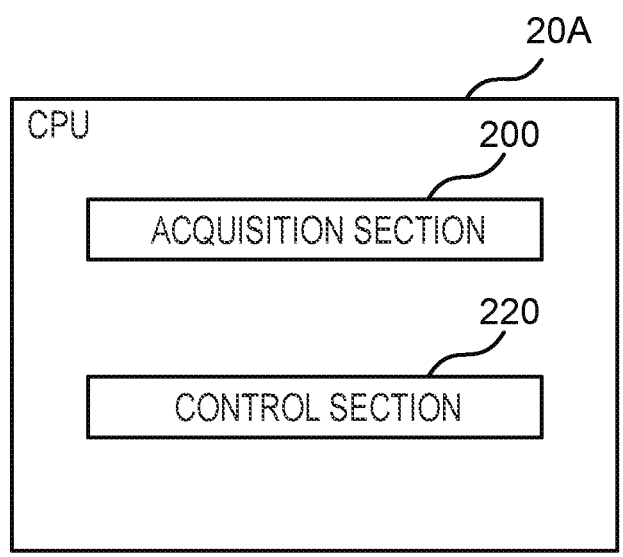
FIG. 3 is a block diagram illustrating functional configuration of a CPU of an ECU of the first exemplary embodiment.

As illustrated in FIG. 3, the CPU 20A of the ECU 20 of the present exemplary embodiment executes the control program 100 in order to function as an acquisition section 200 and a control section 220.

The acquisition section 200 includes functionality to acquire respective states of the first DC-DC converter 25 and the second DC-DC converter 26. Note that the states acquired from the respective DC-DC converters 24 include an output voltage of each DC-DC converter 24. The acquisition section 200 also acquires a voltage of the auxiliary equipment battery 28. The acquisition section 200 is also capable of acquiring operational statuses of respective sections including the auxiliary equipment 32 of the vehicle 12 from the ECU array 34.

The control section 220 performs power control processing to control the outputs of the respective DC-DC converters 24. The control section 220 of the present exemplary embodiment sets instructed voltage values for each of the DC-DC converters 24 in order to regulate power output. Under normal circumstances, the control section 220 performs control to set the second DC-DC converter 26 to an instructed voltage value that is a value that is lower by predetermined value V than an instructed voltage value of the first DC-DC converter 25, thereby prioritizing the output of the first DC-DC converter 25.

If the value V is too large, in cases in which the load at the auxiliary equipment 32 increases and output of the first DC-DC converter 25 becomes insufficient, a voltage supplemented by the output of the second DC-DC converter 26 will become low. Further, if the value V is too small, the output priority relationship may be disrupted as a result of variation in the outputs of the two DC-DC converters 24, rendering the prioritization of output by the first DC-DC converter 25 as originally envisaged unachievable. Accordingly, in the present exemplary embodiment, the predetermined value V is set in the following manner.

Figure 4:
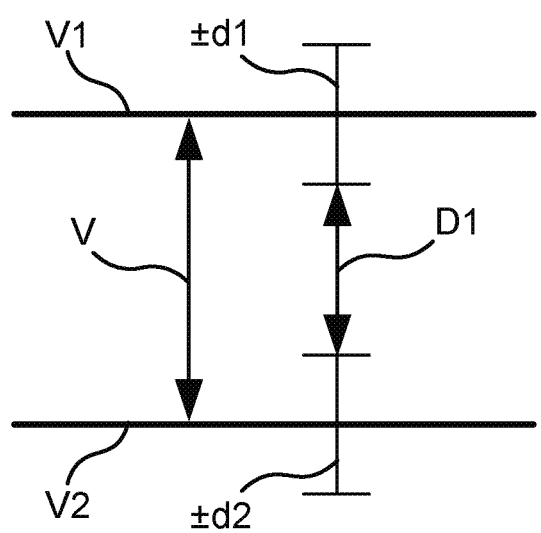
FIG. 4 is a diagram to explain a relationship between an instructed voltage value of a first DC-DC converter and an instructed voltage value of a second DC-DC converter of the first exemplary embodiment.

As illustrated in FIG. 4, the instructed voltage value of the first DC-DC converter 25 is denoted V1, variation in voltage accompanying variation in output is denoted ±d1, the instructed voltage value of the second DC-DC converter 26 is denoted V2, and variation in voltage accompanying variation in output is denoted ±d2. A minimum voltage difference that should be secured between the first DC-DC converter 25 and the second DC-DC converter 26 is denoted D1. Thus V2=V1−(d1+d2+D1). Namely, the predetermined value V should be set such that V=d1+d2+D1.

Flow of Control

Figure 5:
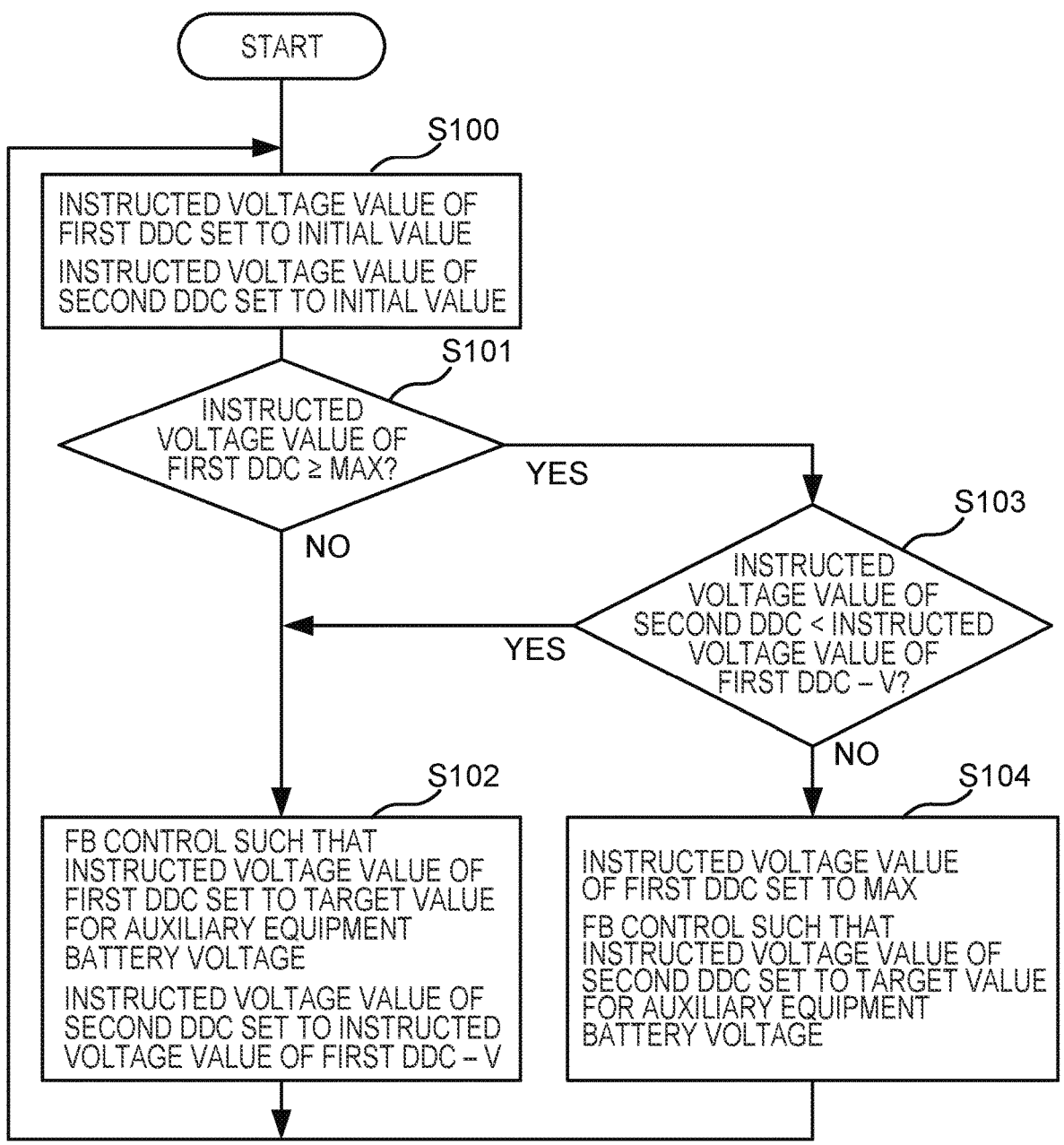
FIG. 5 is a flowchart illustrating a flow of power control processing of the first exemplary embodiment.

Explanation follows regarding a flow of power control processing executed by the ECU 20 of the present exemplary embodiment, with reference to the flowchart of FIG. 5. The processing by the ECU 20 is implemented by the CPU 20A functioning as the acquisition section 200 and the control section 220 described above. Note that in each of the drawings, "DC-DC converter" is abbreviated to "DDC", and the "feedback control" is abbreviated to "FB control".

In the power control processing serving as a control method of the present exemplary embodiment, the instructed voltage values of the respective DC-DC converters 24 are set so as to control the outputs thereof.

At step S100 in FIG. 5, the CPU 20A sets the instructed voltage value of the first DC-DC converter 25 to an initial value, and sets the instructed voltage value of the second DC-DC converter 26 to an initial value.

At step S101, the CPU 20A determines whether or not the instructed voltage value of the first DC-DC converter 25 is a maximum value or greater. In cases in which the CPU 20A determines that the instructed voltage value of the first DC-DC converter 25 is the maximum value or greater (in cases of YES in step S101), processing proceeds to step S103. On the other hand, in cases in which the CPU 20A determines that the instructed voltage value of the first DC-DC converter 25 is not the maximum value or greater, namely is less than the maximum value (in cases of NO in step S101), processing proceeds to step S102.

At step S102, the CPU 20A sets the instructed voltage value of the first DC-DC converter 25 so as to be subject to feedback control according to a target value for the voltage of the auxiliary equipment battery 28, and sets the instructed voltage value of the second DC-DC converter 26 to a value corresponding to the instructed voltage value of the first DC-DC converter 25 minus V. Processing then returns to step S100.

At step S103, the CPU 20A determines whether or not the instructed voltage value of the second DC-DC converter 26 is a smaller value than the instructed voltage value of the first DC-DC converter 25 minus V In cases in which the CPU 20A determines that the instructed voltage value of the second DC-DC converter 26 is a smaller value than the instructed voltage value of the first DC-DC converter 25 minus V (in cases of YES in step S103), processing proceeds to step S102. On the other hand, in cases in which the CPU 20A determines that the instructed voltage value of the second DC-DC converter 26 is not a smaller value than the instructed voltage value of the first DC-DC converter 25 minus V, namely is equal to or greater than a value corresponding to the instructed voltage value of the first DC-DC converter 25 minus V (in cases of NO in step S103), processing proceeds to step S104.

At step S104, the CPU 20A sets the instructed voltage value of the first DC-DC converter 25 to the maximum value, and sets the instructed voltage value of the second DC-DC converter 26 so as to be subject to feedback control according to the target value for the voltage of the auxiliary equipment battery 28. Processing then returns to step S100.

Figure 6:
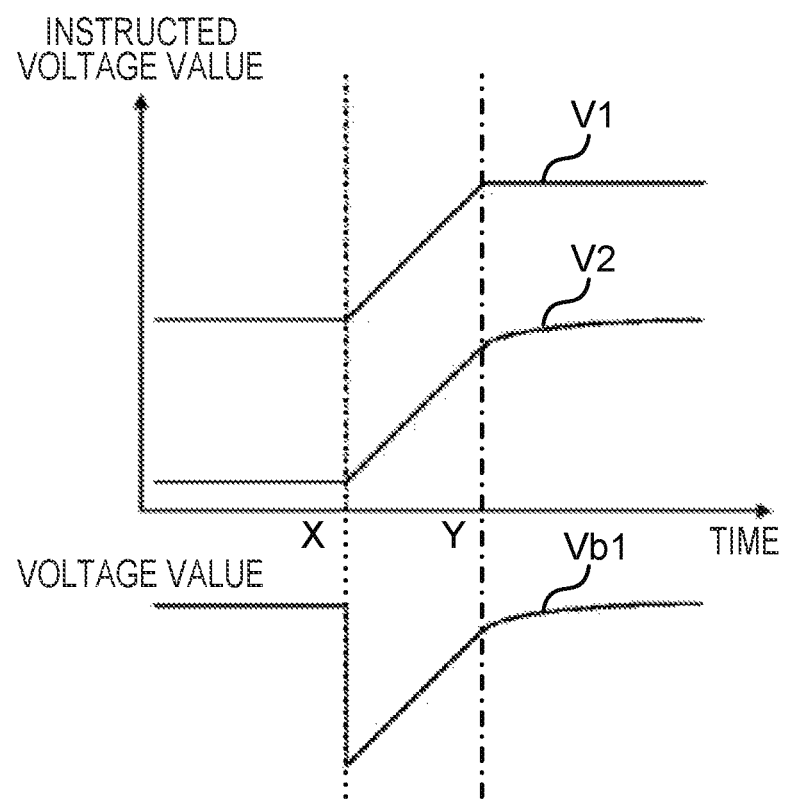
FIG. 6 is a diagram illustrating instructed voltage values of respective DC-DC converters and a voltage value of auxiliary equipment accompanying an increase in load of the auxiliary equipment in a power supply system of the first exemplary embodiment.

Explanation follows regarding operation of the power control processing according to the flowchart described above, with reference to the example illustrated in FIG. 6. Under normal circumstances in which the output of the first DC-DC converter 25 is more than sufficient, the instructed voltage value V1 of the first DC-DC converter 25 is subject to feedback control according to the target value for the voltage of the auxiliary equipment battery 28 so as to maintain a voltage Vb1 to the auxiliary equipment 32 (see step S102).

If the load of the auxiliary equipment 32 increases at a timing X, the voltage Vb1 of the auxiliary equipment battery 28 will decrease sharply. In response, the CPU 20A raises the instructed voltage value V1 of the first DC-DC converter 25 and raises the instructed voltage value V2 of the second DC-DC converter 26 in coordination therewith so as to boost the voltage Vb1 of the auxiliary equipment battery 28.

Then, if the output of the first DC-DC converter 25 reaches the maximum and overload occurs at a timing Y, the instructed voltage value V2 of the second DC-DC converter 26 is subject to feedback control according to the target value for the voltage of the auxiliary equipment battery 28 while keeping the instructed voltage value V1 of the first DC-DC converter 25 at the maximum, such that the voltage Vb1 to the auxiliary equipment 32 is maintained (see step S104).

In the example in FIG. 6, the CPU 20A performs feedback control on the instructed voltage value V2 of the second DC-DC converter 26 such that the voltage Vb1 of the auxiliary equipment battery 28 recovers to its original voltage value, while holding the instructed voltage value V1 of the first DC-DC converter 25 at its maximum value. Accordingly, the rate of increase of the instructed voltage value V2 then slows as the voltage Vb1 recovers and the voltage value stabilizes.

Note that if the load of the auxiliary equipment 32 subsequently drops, the voltage Vb1 of the auxiliary equipment 32 approaches the instructed voltage value V1 of the first DC-DC converter 25 (namely, the maximum value thereof). The instructed voltage value V2 of the second DC-DC converter 26 that is subject to feedback control accordingly drops, and control returns to that performed under normal circumstances (see step S103).

Summary of Exemplary Embodiment

In the power supply system 10 of the present exemplary embodiment, the ECU 20 controls the first DC-DC converter 25 and the second DC-DC converter 26 that supply power to the auxiliary equipment 32. By performing the power control processing described above, the ECU 20 of the present exemplary embodiment is capable of supplying the voltage demanded by the auxiliary equipment 32 irrespective of the load of the auxiliary equipment 32. In particular, under normal circumstances in which the output of the first DC-DC converter 25 is more than sufficient, the voltage demanded by the auxiliary equipment 32 is supplied irrespective of the load of the auxiliary equipment 32, and the second DC-DC converter 26 enables speedy recovery of the voltage of the auxiliary equipment 32 from when the load starts to increase to when the load becomes excessive.

The vehicle 12 of the present exemplary embodiment is capable of keeping the auxiliary equipment battery 28 at a predefined charge level since the voltage demanded can be supplied to the auxiliary equipment 32 irrespective of the load of the auxiliary equipment 32.

Second Exemplary Embodiment

In a second exemplary embodiment, the method for setting the instructed voltage value of the second DC-DC converter 26 under normal circumstances differs to that of the first exemplary embodiment. Note that a power supply system 10 of the present exemplary embodiment has similar configuration to that of the first exemplary embodiment. Equivalent configurations are therefore allocated the same reference numerals, and detailed explanation thereof is omitted.

Figure 7:
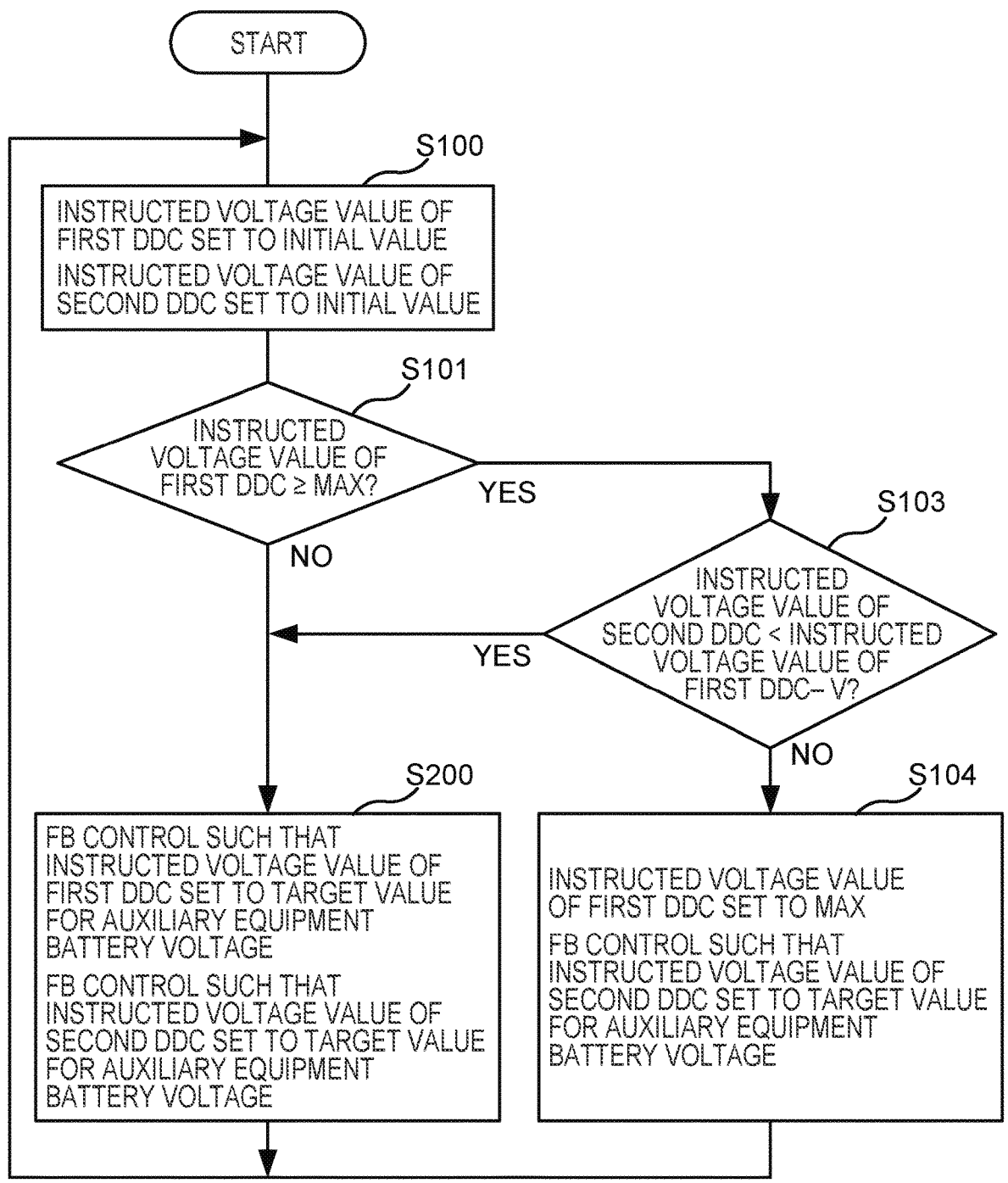
FIG. 7 is a flowchart illustrating a flow of power control processing in a second exemplary embodiment.

Explanation follows regarding power control processing of the present exemplary embodiment, with reference to FIG. 7. Note that steps equivalent to those of the power control processing of the first exemplary embodiment are allocated the same step numbers, and explanation thereof is omitted.

In cases in which the CPU 20A determines that the instructed voltage value of the first DC-DC converter 25 is less than the maximum value at step S101 in FIG. 7 (in cases of NO in step S101), the following processing is executed at step S200. Similarly, in cases in which the CPU 20A determines that the instructed voltage value of the second DC-DC converter 26 is smaller than a value corresponding to the instructed voltage value of the first DC-DC converter 25 minus V at step S103 (in cases of YES in step S103), the processing of step S200 is executed.

At step S200, the CPU 20A sets the instructed voltage value of the first DC-DC converter 25 so as to be subject to feedback control according to the target value for the voltage of the auxiliary equipment battery 28, and also sets the instructed voltage value of the second DC-DC converter 26 so as to be subject to feedback control according to a value corresponding to the target value for the voltage of the auxiliary equipment battery 28 minus V. Note that the predetermined value employed as V is set based on similar principles to those described in the first exemplary embodiment. Processing then returns to step S100.

Figure 8:
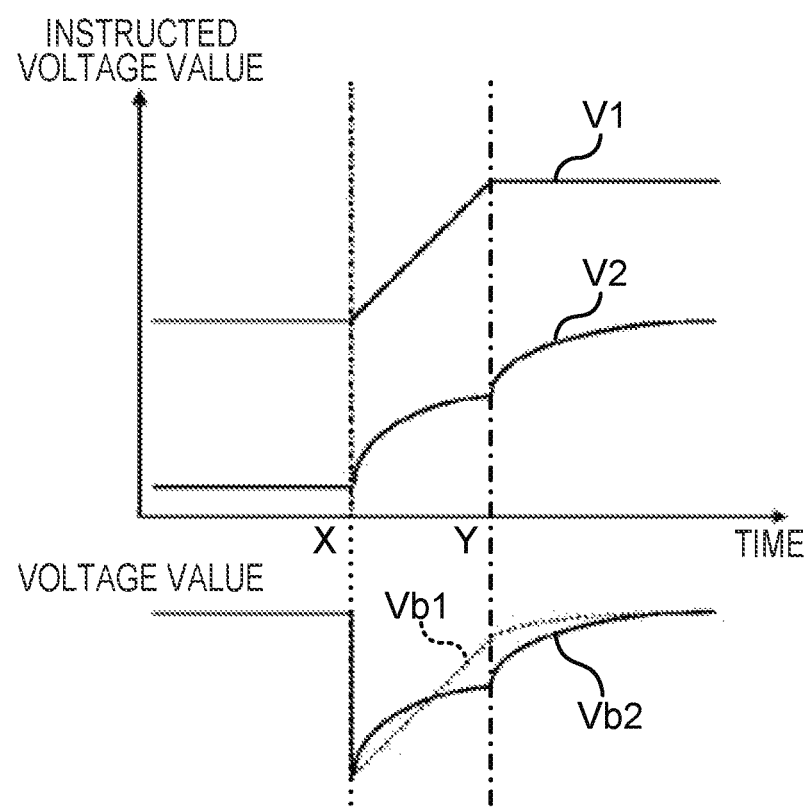
FIG. 8 is a diagram illustrating instructed voltage values of respective DC-DC converters and voltage values of auxiliary equipment accompanying an increase in load of the auxiliary equipment in a power supply system of the second exemplary embodiment.

Explanation follows regarding operation of the power control processing of the present exemplary embodiment, with reference to the example illustrated in FIG. 8. Under normal circumstances in which the output of the first DC-DC converter 25 is more than sufficient, the instructed voltage value V1 of the first DC-DC converter 25 is subject to feedback control according to the target value for the voltage of the auxiliary equipment battery 28 so as to maintain a voltage Vb2 to the auxiliary equipment 32 (see step S200).

If the load of the auxiliary equipment 32 increases at a timing X, the voltage Vb2 of the auxiliary equipment battery 28 will decrease sharply. In response, the CPU 20A raises the instructed voltage value V1 of the first DC-DC converter 25. Moreover, the instructed voltage value V2 of the second DC-DC converter 26 increases sharply accompanying the feedback control of step S200, resulting in an coordinated sharp increase in the voltage Vb2 of the auxiliary equipment battery 28.

Then, if the output of the first DC-DC converter 25 reaches the maximum and overload occurs at a timing Y, the instructed voltage value V2 of the second DC-DC converter 26 is subject to feedback control in accordance with the target value for the voltage of the auxiliary equipment battery 28 while keeping the instructed voltage value V1 of the first DC-DC converter 25 at the maximum such that the voltage Vb2 to the auxiliary equipment 32 is maintained (see step S104).

In the example in FIG. 8, when the instructed voltage value V1 of the first DC-DC converter 25 is held at its maximum value, the instructed voltage value V2 of the second DC-DC converter 26 undergoes another sharp increase in conjunction with feedback control, resulting in a coordinated sharp increase in the voltage Vb2 of the auxiliary equipment battery 28. The rate of increase of the instructed voltage value V2 then slows as the voltage Vb2 recovers and the voltage value stabilizes.

As described above, in the present exemplary embodiment, under normal circumstances in which the output of the first DC-DC converter 25 is more than sufficient, the voltage demanded by the auxiliary equipment 32 is supplied irrespective of the load of the auxiliary equipment 32. In cases in which the load has started to increase, using the second DC-DC converter 26 enables the voltage to be raised speedily in line with the increase in load.

Third Exemplary Embodiment

In a third exemplary embodiment, power control processing is executed based on a combination of the first exemplary embodiment and the second exemplary embodiment. Note that a power supply system 10 of the present exemplary embodiment has similar configuration to that of the first exemplary embodiment. Equivalent configurations are therefore allocated the same reference numerals, and detailed explanation thereof is omitted.

Figure 9:
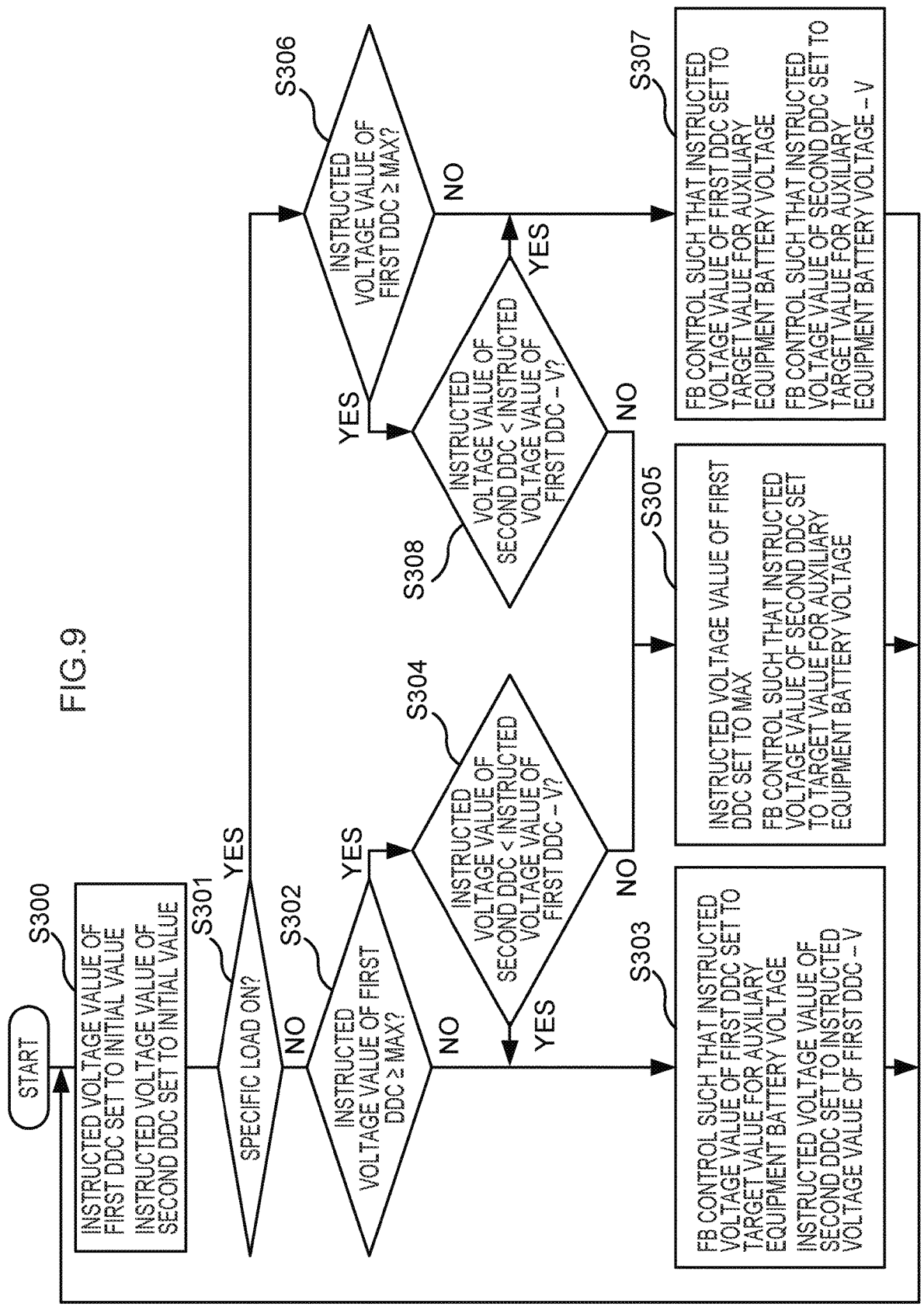
FIG. 9 is a flowchart illustrating a flow of power control processing in a third exemplary embodiment.

Explanation follows regarding power control processing of the present exemplary embodiment, with reference to FIG. 9.

At step S300 in FIG. 9, the CPU 20A sets the instructed voltage value of the first DC-DC converter 25 to an initial value, and sets the instructed voltage value of the second DC-DC converter 26 to an initial value.

At step S301, the CPU 20A determines whether or not a specific load has become ON. Examples of a specific load in the present exemplary embodiment include operation of headlights and electrical power steering, these configuring the auxiliary equipment 32. In cases in which the CPU 20A determines that a specific load has become ON (in cases of YES in step S301), processing proceeds to step S306. On the other hand, in cases in which the CPU 20A determines that a specific load has not become ON (in cases of NO in step S301), processing proceeds to step S302.

At step S302, the CPU 20A determines whether or not the instructed voltage value of the first DC-DC converter 25 is the maximum value or greater. In cases in which the CPU 20A determines that the instructed voltage value of the first DC-DC converter 25 is the maximum value or greater (in cases of YES in step S302), processing proceeds to step S304. On the other hand, in cases in which the CPU 20A determines that the instructed voltage value of the first DC-DC converter 25 is not the maximum value or greater, namely is less than the maximum value (in cases of NO in step S302), processing proceeds to step S303.

At step S303, the CPU 20A sets the instructed voltage value of the first DC-DC converter 25 so as to be subject to feedback control according to a target value for the voltage of the auxiliary equipment battery 28, and sets the instructed voltage value of the second DC-DC converter 26 to a value corresponding to the instructed voltage value of the first DC-DC converter 25 minus V. Processing then returns to step S300.

At step S304, the CPU 20A determines whether or not the instructed voltage value of the second DC-DC converter 26 is a smaller value than the instructed voltage value of the first DC-DC converter 25 minus V In cases in which the CPU 20A determines that the instructed voltage value of the second DC-DC converter 26 is a smaller value than the instructed voltage value of the first DC-DC converter 25 minus V (in cases of YES in step S304), processing proceeds to step S303. On the other hand, in cases in which the CPU 20A determines that the instructed voltage value of the second DC-DC converter 26 is not a smaller value than the instructed voltage value of the first DC-DC converter 25 minus V, namely is equal to or greater than a value corresponding to the instructed voltage value of the first DC-DC converter 25 minus V (in cases of NO in step S304), processing proceeds to step S305.

At step S305, the CPU 20A sets the instructed voltage value of the first DC-DC converter 25 to the maximum value, and sets the instructed voltage value of the second DC-DC converter 26 so as to be subject to feedback control according to the target value for the voltage of the auxiliary equipment battery 28. Processing then returns to step S300.

At step S306, the CPU 20A determines whether or not the instructed voltage value of the first DC-DC converter 25 is the maximum value or greater. In cases in which the CPU 20A determines that the instructed voltage value of the first DC-DC converter 25 is the maximum value or greater (in cases of YES in step S306), processing proceeds to step S308. On the other hand, in cases in which the CPU 20A determines that the instructed voltage value of the first DC-DC converter 25 is not the maximum value or greater, namely is less than the maximum value (in cases of NO in step S306), processing proceeds to step S307.

At step S307, the CPU 20A sets the instructed voltage value of the first DC-DC converter 25 so as to be subject to feedback control in accordance with the target value for the voltage of the auxiliary equipment battery 28, and also sets the instructed voltage value of the second DC-DC converter 26 so as to be subject to feedback control in accordance with a value corresponding to the target value for the voltage of the auxiliary equipment battery 28 minus V. Processing then returns to step S300.

At step S308, the CPU 20A determines whether or not the instructed voltage value of the second DC-DC converter 26 is a smaller value than the instructed voltage value of the first DC-DC converter 25 minus V In cases in which the CPU 20A determines that the instructed voltage value of the second DC-DC converter 26 is a smaller value than the instructed voltage value of the first DC-DC converter 25 minus V (in cases of YES in step S308), processing proceeds to step S307. On the other hand, in cases in which the CPU 20A determines that the instructed voltage value of the second DC-DC converter 26 is not a smaller value than the instructed voltage value of the first DC-DC converter 25 minus V namely, is equal to or greater than a value corresponding to the instructed voltage value of the first DC-DC converter 25 minus V (in cases of NO in step S308), processing proceeds to step S305.

As described above, a characteristic feature of the present exemplary embodiment is found in the control method applied to the second DC-DC converter 26 under normal circumstances in which the output of the first DC-DC converter 25 is more than sufficient. Specifically, in the present exemplary embodiment, with the exception of cases of a specific load, the instructed voltage value of the second DC-DC converter 26 is controlled so as to become a value that is lower by the predetermined value V than the instructed voltage value of the first DC-DC converter 25, such that the voltage to the auxiliary equipment 32 is maintained (control A).

On the other hand, in cases in which a specific load is generated on the headlights or the electrical power steering unit configuring the auxiliary equipment 32, the instructed voltage value of the second DC-DC converter 26 is subject to feedback control in accordance with a value that is lower by the predetermined value V than the target value for the voltage of the auxiliary equipment battery 28, such that the voltage to the auxiliary equipment 32 is maintained (control B).

As illustrated in FIG. 8, control B (see Vb2) allows faster recovery from momentary voltage drops than control A (see Vb1), but requires more time to regain the voltage value prior to the increase in load. The headlights and electrical power steering unit given as an example of specific loads are auxiliary equipment 32 with implications for travel of the vehicle 12, and it is therefore preferable that a sudden drop in voltage accompanying this load be suppressed as much as possible. Accordingly, in the present exemplary embodiment, the control B is applied in response to a specific load that has implications for travel of the vehicle 12, and the control A is applied in cases other than a specific load. The present exemplary embodiment thereby enables the manner in which the voltage of the auxiliary equipment 32 is tracked to be varied according to the load type.

Modified Examples

In the exemplary embodiment described above, under normal circumstances in which the output of the first DC-DC converter 25 is more than sufficient, the instructed voltage value of the second DC-DC converter 26 is set to a value of the instructed voltage value of the first DC-DC converter 25 minus V. The predetermined value employed as V is set to a value that considers variation in the outputs of the respective DC-DC converters 24, as explained with reference to FIG. 4. However, the method for setting the instructed voltage value of the second DC-DC converter 26 under normal circumstances is not limited thereto.

Figure 10:
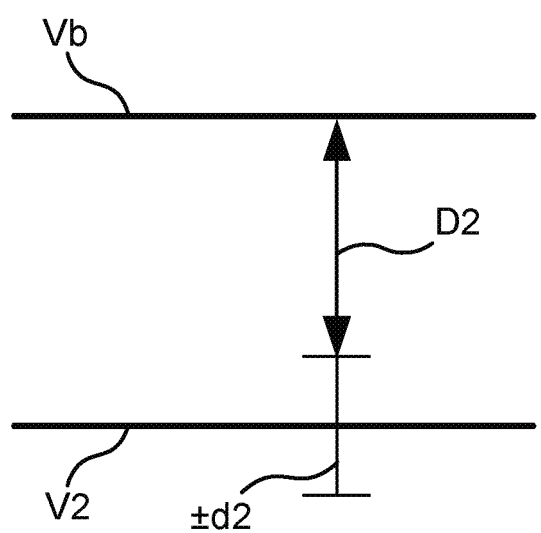
FIG. 10 is a diagram to explain a method for setting an instructed voltage value of a second DC-DC converter in a modified example 1.

For example, as illustrated in FIG. 10, in a modified example 1, a minimum voltage difference that should be secured between the auxiliary equipment battery 28 and the second DC-DC converter 26 is denoted D2. The instructed voltage value of the second DC-DC converter 26 is denoted V2, and variation in voltage accompanying variation in output is denoted ±d2. Thus, V2=Vb−D2−d2. Namely, setting the instructed voltage value V2 of the second DC-DC converter 26 to Vb−D2−d2 enables power output from the first DC-DC converter 25 to be prioritized over that from the second DC-DC converter 26.

As another example, in a modified example 2, a voltage obtained by subtracting a fixed value from an output terminal voltage of the first DC-DC converter 26 is set as the instructed voltage value of the second DC-DC converter 26. Namely, the instructed voltage value of the second DC-DC converter 26 will always be a lower voltage value than an output terminal voltage of the first DC-DC converter 25 that is connected to both the second DC-DC converter 26 and the auxiliary equipment 32. Accordingly, power output from the first DC-DC converter 25 will be prioritized over that from the second DC-DC converter 26.

REMARKS

Note that the various processing executed by the CPU 20A reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, in the exemplary embodiments described above, explanation has been given regarding cases in which programs are stored in advance (installed) on a computer-readable non-transitory storage medium. For example, the control program 100 for the ECU 20 is stored in advance in the ROM 20B. However, there is no limitation thereto, and the programs may be provided in a format stored in a non-transitory storage medium such as a compact disc read only memory (CD-ROM), digital versatile disc read only memory (DVD-ROM), or universal serial bus (USB) memory. Alternatively, the programs may be downloadable from an external device over a network.

The processing flows described above in the foregoing exemplary embodiments are merely examples, and unnecessary steps may be removed, additional steps may be provided, and the processing sequence may be changed within a range not departing from the spirit thereof.

What is claimed is:

1. A control device for controlling a first DC-DC converter and a second DC-DC converter that supply power to equipment, the control device comprising:
a processor configured to:
fix an output of the first DC-DC converter at a maximum and perform feedback control such that an output of the second DC-DC converter satisfies a predetermined condition in a case in which the output of the first DC-DC converter has reached the maximum;
in a case in which an instructed voltage value of the first DC-DC converter is below a maximum value, perform feedback control such that the instructed voltage value of the first DC-DC converter becomes a first target value, and perform control such that an instructed voltage value of the second DC-DC converter becomes a value that is lower by a predetermined value than the instructed voltage value of the first DC-DC converter; and
in a case in which the instructed voltage value of the first DC-DC converter has reached the maximum value, perform control such that the instructed voltage value of the first DC-DC converter remains at the maximum value and perform feedback control such that the instructed voltage value of the second DC-DC converter becomes a second target value.

2. The control device of claim 1, wherein, in a case in which the instructed voltage value of the first DC-DC converter is below the maximum value and a specific load has been generated at the equipment, the processor is configured to perform feedback control such that the instructed voltage value of the first DC-DC converter becomes a third target value, and perform feedback control such that the instructed voltage value of the second DC-DC converter becomes a value that is lower by a predetermined value than the third target value.

3. The control device of claim 1, wherein the predetermined value is set to a value that takes account of variation in DC-DC converter output.

4. The control device of claim 3, wherein the predetermined value is set to a value that further takes account of a minimum voltage difference that needs to be secured.

5. A vehicle comprising:
the control device of claim 1;
a high voltage battery configured to supply power to each of the first DC-DC converter and the second DC-DC converter; and
an auxiliary equipment battery configured to supply power to the equipment and to receive power supplied from each of the first DC-DC converter and the second DC-DC converter.

6. A control method for execution by a computer to control a first DC-DC converter and a second DC-DC converter that supply power to equipment, the control method comprising:
in a case in which an output of the first DC-DC converter has reached a maximum, fixing the output of the first DC-DC converter at the maximum and performing feedback control such that an output of the second DC-DC converter satisfies a predetermined condition;
in a case in which an instructed voltage value of the first DC-DC converter is below a maximum value, performing feedback control such that the instructed voltage value of the first DC-DC converter becomes a first target value, and performing control such that an instructed voltage value of the second DC-DC converter becomes a value that is lower by a predetermined value than the instructed voltage value of the first DC-DC converter; and
in a case in which the instructed voltage value of the first DC-DC converter has reached the maximum value, performing control such that the instructed voltage value of the first DC-DC converter remains at the maximum value and performing feedback control such that the instructed voltage value of the second DC-DC converter becomes a second target value.

7. A non-transitory storage medium storing a control program executable by a computer to perform processing to control a first DC-DC converter and a second DC-DC converter that supply power to equipment, the processing comprising:
in a case in which an output of the first DC-DC converter has reached a maximum, fixing the output of the first DC-DC converter at the maximum and performing feedback control such that an output of the second DC-DC converter satisfies a predetermined condition;
in a case in which an instructed voltage value of the first DC-DC converter is below a maximum value, performing feedback control such that the instructed voltage value of the first DC-DC converter becomes a first target value, and performing control such that an instructed voltage value of the second DC-DC converter becomes a value that is lower by a predetermined value than the instructed voltage value of the first DC-DC converter; and
in a case in which the instructed voltage value of the first DC-DC converter has reached the maximum value, performing control such that the instructed voltage value of the first DC-DC converter remains at the maximum value and performing feedback control such that the instructed voltage value of the second DC-DC converter becomes a second target value.

* * * * *